United States Patent [19]

Harig

[11] 4,380,298

[45] Apr. 19, 1983

[54] KNOCK DOWN STORE DISPLAY FIXTURE

[75] Inventor: Robert G. Harig, Paragould, Ark.

[73] Assignee: Darling Store Fixtures, Paragould, Ark.

[21] Appl. No.: 239,451

[22] Filed: Mar. 2, 1981

[51] Int. Cl.³ ............................................. A47F 5/00
[52] U.S. Cl. .................................. 211/189; 211/182; 211/190; 211/204; 248/188.1; 403/245
[58] Field of Search ............... 211/189, 182, 190, 204, 211/205, 207, 105.3; 248/157, 161, 188, 188.1, 188.8; 403/245, 246, 264

[56] References Cited

U.S. PATENT DOCUMENTS

| | | | |
|---|---|---|---|
| 3,329,282 | 7/1967 | Swan et al. | 211/190 |
| 3,480,155 | 11/1969 | Ferdinad et al. | 211/190 |
| 3,529,808 | 9/1970 | Siebers | 403/264 X |
| 3,533,513 | 10/1970 | Berman | 211/189 |
| 3,642,310 | 2/1972 | Hudson | 403/264 X |
| 4,105,348 | 8/1978 | Anderson et al. | 211/182 X |
| 4,126,288 | 11/1978 | DeSisto et al. | 248/188.1 |

*Primary Examiner*—Francis K. Zugel
*Assistant Examiner*—Robert W. Gibson, Jr.
*Attorney, Agent, or Firm*—Emch, Schaffer & Schaub

[57] ABSTRACT

An improved frictional connection or joint for interconnecting parts in knock down display fixtures. The joint is of a telescopic type having a flat strap which is attached to one member and telescopes into an opening in a second member. Spaced apart clips are provided on the strap for frictionally engaging the interior member opening when the strap is moved to a position such that both clips are within the opening.

8 Claims, 6 Drawing Figures

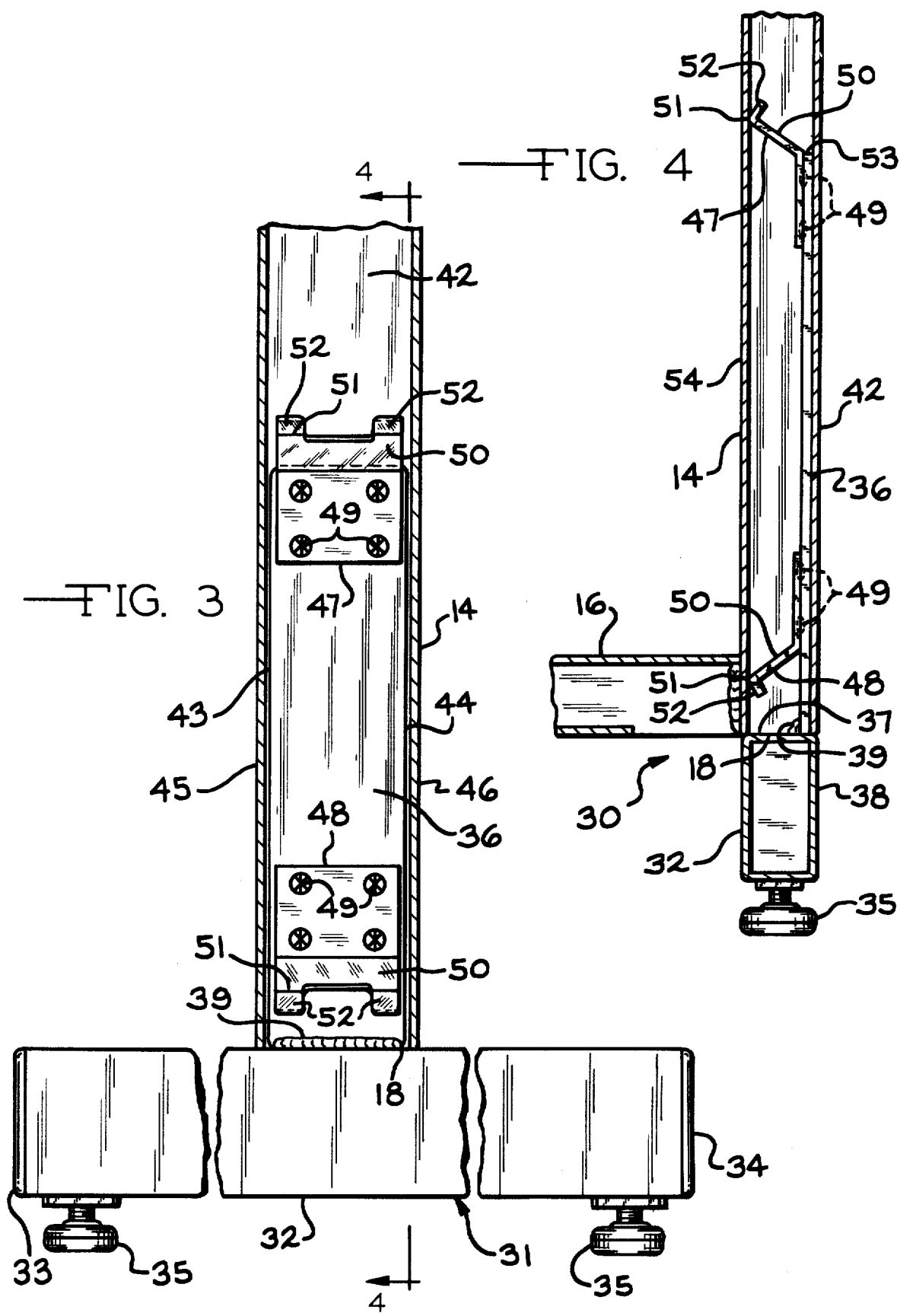

KNOCK DOWN STORE DISPLAY FIXTURE

BACKGROUND OF THE INVENTION

The present invention is directed to store display fixtures and more particulary to an improved joint construction for a display fixture which is readily knocked down for shipment and reassembled with only a hammer.

It is desirable to have store display fixtures which are either totally disassembled or only partially assembled for shipment in order to minimize the size of the shipping container, thereby reducing the shipping and storage costs. Assembly of the display fixture after shipment often requires the use of several tools. Commonly, parts are telescoped together and are held together either by friction or with bolts. There are several disadvantages to using bolts for assembling display fixtures. The use of the bolts require the availability of tools and a degree of skill in following assembly instructions. Also, there is a risk that the bolts will be lost during shipment or that the manufacturer may accidently provide insufficient bolts. Furthermore, the manufacturer must carefully drill holes in the parts so that the holes properly align to receive the bolts during assembly.

Problems also sometimes occur with parts which are held together by friction. If manufacturing tolerances are not accurately maintained, the parts either may not go together or may not stay together. For example, legs on display fixtures sometimes are telescoped into the bottom of the fixture frame and held in place with friction. If the legs become loose, they will fall from the fixture if the fixture is lifted for any reason.

SUMMARY OF THE INVENTION

According to the present invention, an improved knock down display fixture is provided with novel frictional connections for attaching parts to the fixture during assembly. The connection is particularly useful for attaching base leg assemblies to rectangular cross-section openings in a fixture frame.

A member such as a base leg assembly is attached to the end of an upright or tube having a rectangular cross-section. Initially a flat strap is welded or otherwise attached to the member. The strap telescopically slides into an open end of the upright or tubular frame member and abuts one side of the tube. The strap is dimensioned to slide into the tube with a minimum edge clearance to prevent edgewise movement of the strap within the tube. Two clips are welded or otherwise attached to the strap in a spaced apart relationship. The clips are dimensioned to have an interference fit with the interior of the tube when the strap is positioned abutting the tube side.

In assembling the connection, the strap is angled relative to the tube to permit the first clip to enter and slide into the tube until the second clip reaches the end of the tube. At this point, the member and the attached strap are pivoted until the strap abuts the interior side of the tube. Finally, the remainder of the strap and the two clips are driven into the tube, for example, with a hammer, until the second clip also engages the interior of the tube and the member abuts the end of the tube. Thus, the member may be attached to the tube by loosely inserting the strap into the tube most of the way and driving the strap and attached clips in only a short distance. Frictional engagement occurs only during the end of the insertion, for example, during the last 1 inch of insertion for a strap on the order of from 8 to 10 inches in length. Thus the connection differs from other telescopic connections which are loose throughout the insertion and require a bolt or other fastener for holding the parts together and it differs from frictional connections which are tight during the entire insertion operation.

Accordingly, it is an object of the present invention to provide an improved connection for use in knock down store display fixtures and the like.

Another object of the invention is to provide an improved frictional connection for connecting a member to the end of a tube having a rectangular cross-section.

Other objects and advantages of the invention will become apparent from the following detailed description, with reference being made to the accompanying drawings.

BRIEF DESCRIPTION OF THE DRAWINGS

FIG. 3 is a side elevational view of a base leg assembly for use in the display fixture of FIG. 1 and showing a fragmentary portion of the frame upright in section;

FIG. 4 is a fragmentary cross-sectional view taken along line 4—4 of FIG. 3;

DESCRIPTION OF THE PREFERRED EMBODIMENTS

Figures 1, 5, 6:
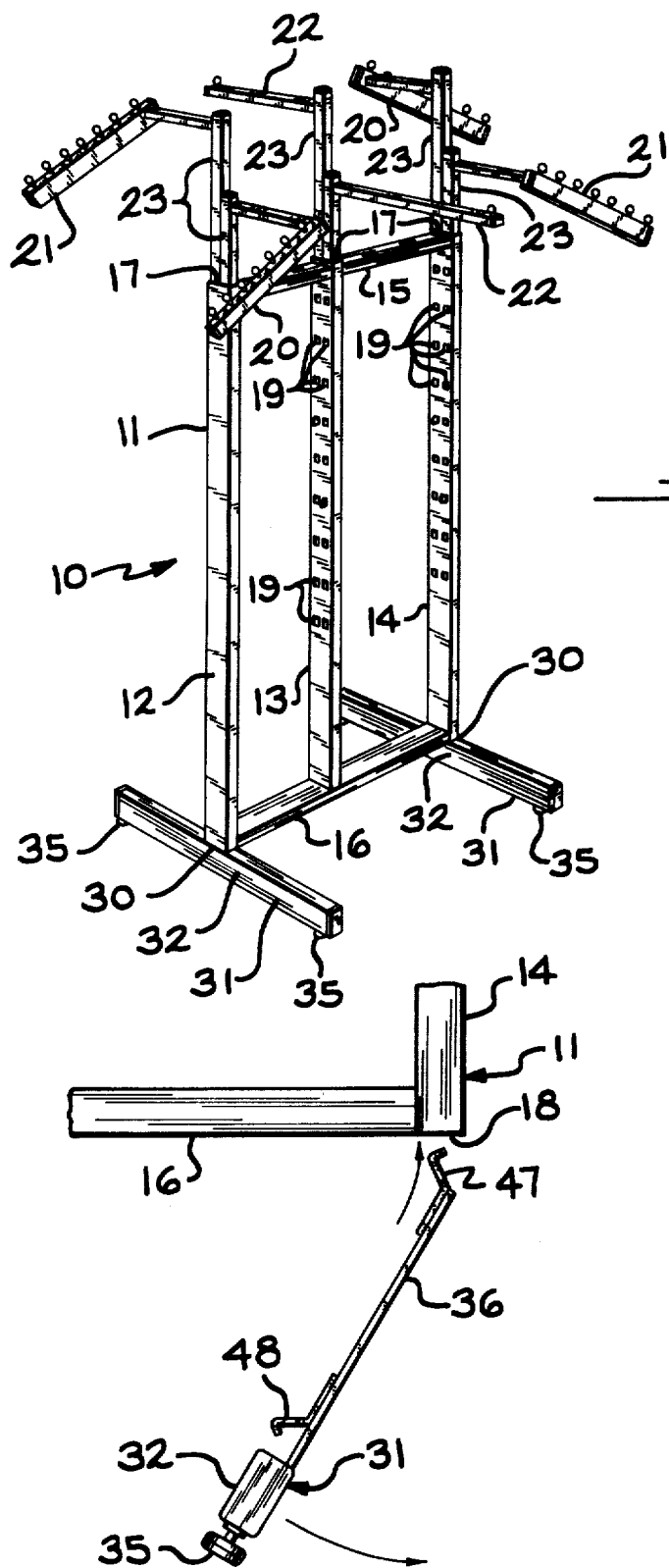
FIG. 1 is a perspective view of a knock down store display fixture having joints constructed in accordance with the present invention.
FIG. 5 is a fragmentary side elevational view showing the initial steps for inserting the strap and one clip on the base leg assembly into the frame upright for assembling the display fixture of FIG. 1.
FIG. 6 is a fragmentary side elevational view showing further assembly of the base leg assembly into the frame upright of the display fixture of FIG. 1.
Figure 2:
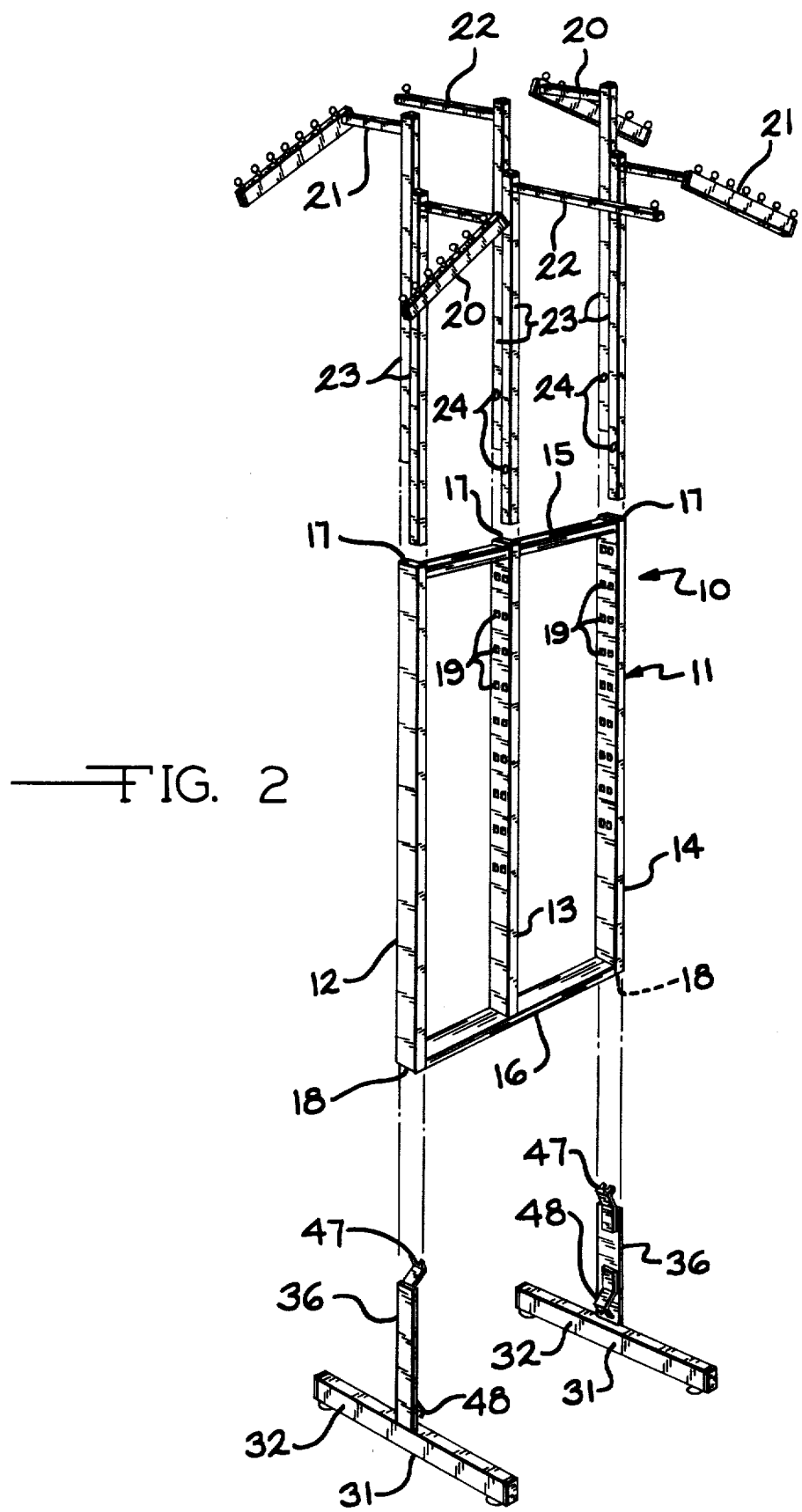
FIG. 2 is an exploded perspective view of the display fixture of FIG. 1.

Turning now to the drawings and particularly to FIGS. 1 and 2, a display fixture 10 is illustrated in accordance with the present invention. The display fixture 10 is designed so as to be easily knocked down for shipment in a relatively flat carton. The display fixture 10 generally includes a frame 11 formed from three spaced, parallel uprights 12, 13 and 14, two upper cross tubes 15 and a lower cross tube 16. The uprights 12, 13 and 14 and the cross tubes 15 and 16 are welded together to form a rigid structure. One of the upper cross tubes 15 extends between the uprights 12 and 13 and the other upper cross tube 15 extends between the uprights 13 and 14. The three uprights 12, 13 and 14 have open upper ends 17 and the outer uprights 12 and 14 also have open lower ends 18. Each of the uprights 12, 13 and 14 also is provided with two parallel rows of vertically spaced openings 19.

Two hanger arms are located within each of the upright openings 17, with left and right slant hanger arms 20 and 21, respectively, located in the openings 17 in each of the outer uprights 12 and 14 and with two identical horizontal hanger arms 22 located in the opening 17 for the center upright 13. Each of the hanger arms 20, 21 and 22 is provided with a vertical section 23 which telescopes into one half of an upright opening 17. A suitable spring loaded plunger 24 is located on each vertical section 23 for engaging one of the spaced openings 19. By selectively engaging the plungers 24 with the openings 19, the height of each individual hanger arm 20–22 is individually adjustable. The spring loaded plungers 24 may be of a conventional design, or, they may be of an improved design such as is shown in U.S. Pat. No. 4,181,230 to David W. Acuff. Furthermore, the openings 19 which receive the plungers 24 may be of either a circular or a rectangular cross-section.

In accordance with the present invention, an improved frictional connection or joint 30 is provided between the frame 11 and two base leg assemblies 31, as shown in detail in FIGS. 2–6. Each base leg assembly 31 includes a horizontal base tube 32 having opposite ends 33 and 34. A separate leveler foot 35 is attached to each base tube 32 adjacent each end 33 and 34 for adjustment to floor irregularities and to arrange the display fixture 10 with the frame 11 extending vertical.

An elongated flat member or strap 36 is attached by a weld 39 to the center of a top side 37 of the base tube 32 and adjacent an outer side 38. The strap 36 projects upwardly from and perpendicular to the base tube 32 and extends parallel to the outer side 38. The strap 36 is attached to the top side 37 at a location spaced inwardly from the outer side 38 by the thickness of the metal in one side 42 of the tubes 12 and 14, as best seen in FIG. 4. The strap 36 is rectangular in shape and has two parallel edges 43 and 44 which are spaced apart by a distance slightly less than the spacing between two opposed sides 45 and 46 of the uprights 12 and 14. Two clips 47 and 48 are attached to the strap 36 with spot welds 49. Each of the clips 47 and 48 has a side 50 sloping away from the strap 36. The side 50 on each clip 47 and 48 extends to a bend 51 spaced from the strap 36 and then the clips 47 and 48 terminate at an inwardly bent portion 52 which may be a continuous side extending across the width of the clips or may be divided into two or more fingers, as shown. Although the clips 47 and 48 are illustrated as being separate from but welded to the strap 36, it should be appreciated that the clips may be formed integrally with the strap 36 by stamping the clips from portions of the strap. However, the clip 48 must be formed without significantly weakening the strap 36 adjacent the base tube 32.

The clip 47 is attached to an end 53 of the strap 36 so that the bend 51 on the clip 47 extends past the strap end 53. The other clip 48 is attached to the strap 36 with the bend 51 close to but slightly spaced from the weld 39 between the strap 37 and the base tube 32. Prior to attaching the base leg assemblies 31 to the frame 11, the total thickness of the strap 36 plus the height of the clips 47 and 48 to the bends 51 is slightly greater than the spacing between the side 42 and an opposing side 54 of the uprights 12 and 14. Consequently, there is an interference fit between the strap 36 and the attached clips 47 and 48 with the interior opening in each upright 12 and 14.

Referring now to FIGS. 5 and 6, assembly of the joint 30 is illustrated. Prior to attaching a base leg assembly 31 to the frame 11, the clip 47 on the strap 36 is positioned adjacent the upright opening 18 and the base leg assembly 31 is tilted relative to the frame 11, as shown in FIG. 5. Tilting provides sufficient clearance to allow the clip 47 and the strap 36 to be moved into the upright opening 18, as shown in FIG. 6. By maintaining a slight angle between the strap 36 and the upright side 42, sufficient clearance is provided to allow the clip 47 and the strap 36 to move into the upright opening 18 until the clip 48 abuts the upright opening 18. At this time, it is necessary to tap the base tube 32 with a hammer to drive the clip 48 into the upright opening 18 until the base tube 32 abuts the upright 12 or 14. It will be noted that the clip 47 and the strap 36 are easily positioned within the upright 12 or 14 until the clip 48 abuts the upright 14. It is necessary only to drive the strap 36 and the two clips 47 and 48 into the upright 12 or 14 the short distance required to move the clip 48 into the upright. However, once the joint 30 is assembled, tight interference type fit occurs between the uprights 12 or 14, the strap 36 and the two spaced apart clips 47 and 48 to tightly hold the strap 36 against the upright side 42. Consequently, the joint 30 is very stable against lateral movement between the leg base assemblies 31 and the frame 11. Thus, the joint 30 differs from prior art frictional connections in which an interference or tight fit takes place throughout insertion of the leg assembly to the frame and it also differs from prior art joint constructions in which the leg or a portion of the leg assembly fits loosely into the frame and is held in place with a separate connector such as a bolt or screw.

Various modifications and changes may be made in the above described display fixture 10 without departing from the spirit and the scope of the following claims. For example, the display fixture 10 has been described as being of a type which includes a generally flat frame and six hanger arms 20–22. However, it will be appreciated that the joint or connection 30 may be used in other types of display fixtures to form a tight connection between fixture parts while permitting the fixture to be shipped in a knock down condition.

What I claim is:

1. In a display fixture having a frame and at least one base, said frame including at least one hollow upright having a rectangular cross-section and an open bottom, such upright opening having a predetermined width and a predetermined depth, an improved joint for attaching said base to said frame comprising a rigid elongated flat strap having two sides and two ends, means attaching one of said strap ends to said base with said strap extending longitudinally upwardly from said base, said strap having a width slightly less than said predetermined width for telescoping from the open bottom into the upright opening with one of said strap sides abutting an interior side of said upright, two clips extending from the other of said strap sides with one of said clips located at the end of said strap spaced from said base and the other of said clips located near said base, each of said clips and said strap having a combined maximum depth slightly greater than said predetermined depth for an interference fit within the upright opening, whereby, when said strap is telescoped into the upright opening, said strap and the attached clips frictionally engage said upright.

2. An improved joint for a display fixture, as set forth in claim 1, wherein at least said other clip is welded to said other strap side.

3. An improved joint for a display fixture, as set forth in claim 1, wherein said clips each have a first side sloping away from said strap to a bend spaced from said strap and a second side sloping from said bend back towards said strap, said second side terminating at a free end.

4. An improved joint for a display fixture, as set forth in claim 3, wherein said bend on said one clip is located further from said base than the strap end spaced from said base.

5. An improved joint construction for attaching a member to the open end of a rectangular tube having a predetermined width and a predetermined depth comprising a rigid elongated flat strap having two sides and two ends, means attaching one of said strap ends to said member with said strap extending longitudinally from said member, said strap having a width slightly less than said predetermined width for telescoping from the open end into the tube opening with one of said strap sides abutting an interior side of said tube, two clips extending from the other of said strap sides with one of said clips located at an end of said strap spaced from said member and the other of said clips located near said member, each of said clips and said strap having a combined maximum depth slightly greater than said predetermined depth for an interference fit within the tube opening, whereby, when said strap is telescoped into the tube opening, said strap and the attached clips frictionally engage said tube.

6. An improved joint construction, as set forth in claim 5, wherein at least said one clip is welded to said other strap side.

7. An improved joint construction, as set forth in claim 5, wherein said clips each have a first side sloping away from said strap to a bend spaced from said strap and a second side sloping from said bend back towards said strap, said second side terminating at a free end.

8. An improved joint construction, as set forth in claim 7, wherein said bend on said one clip is located further from said member than the strap end spaced from said member.

* * * * *